Figure 5:
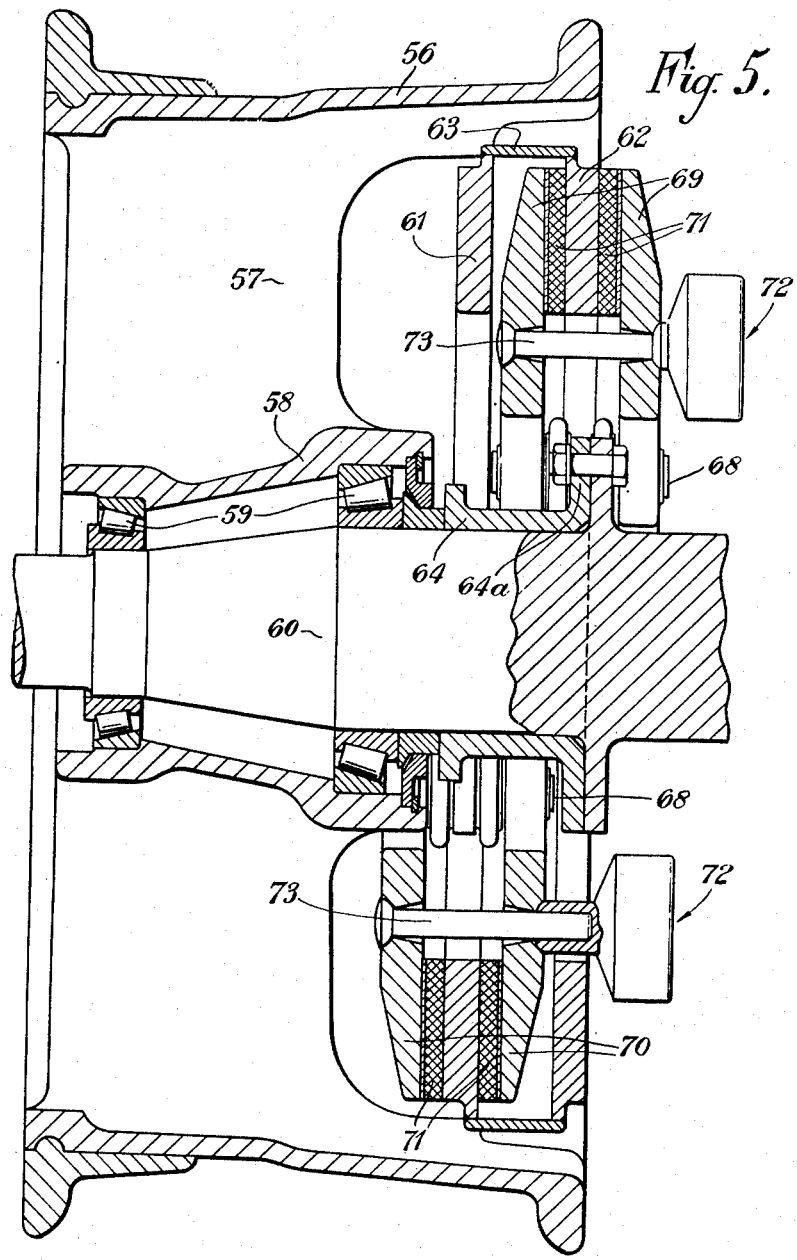

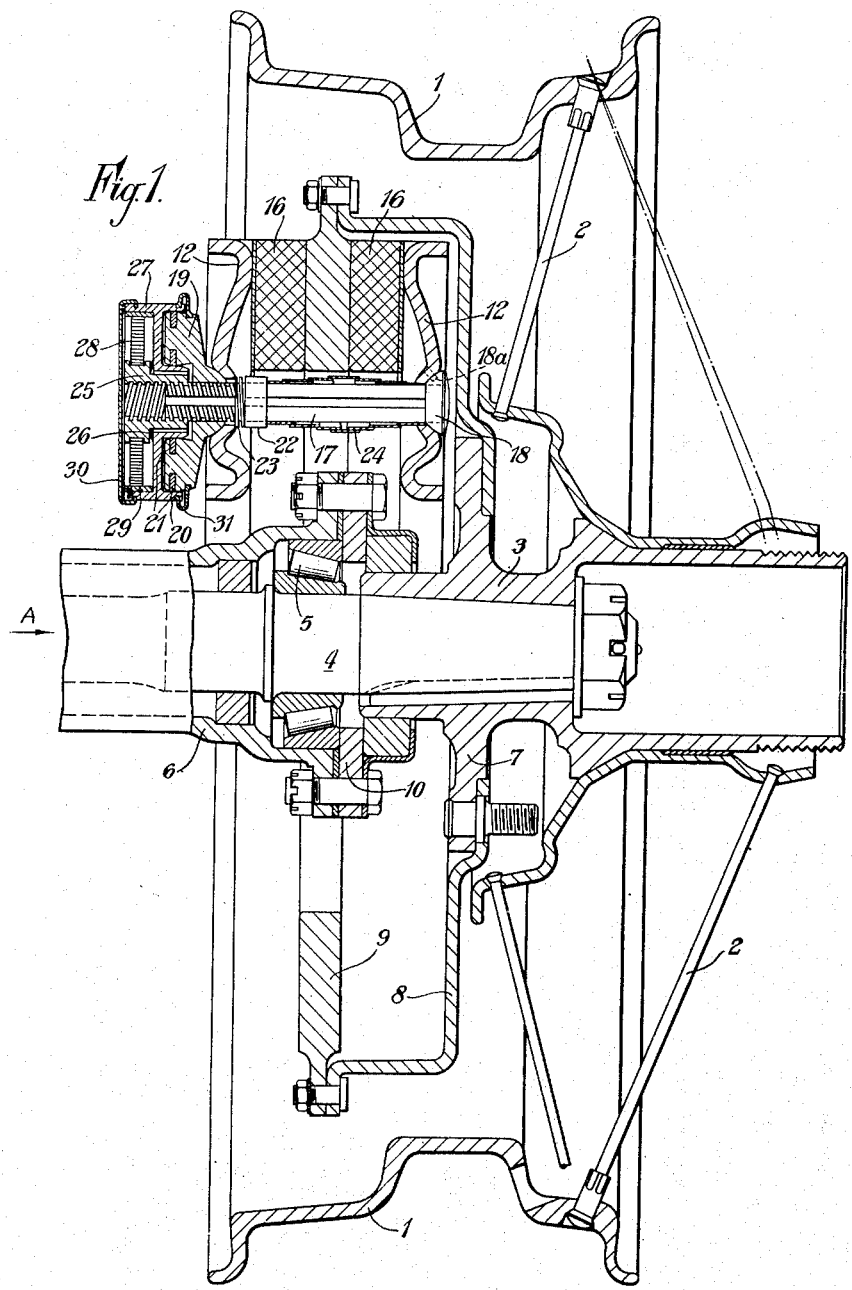

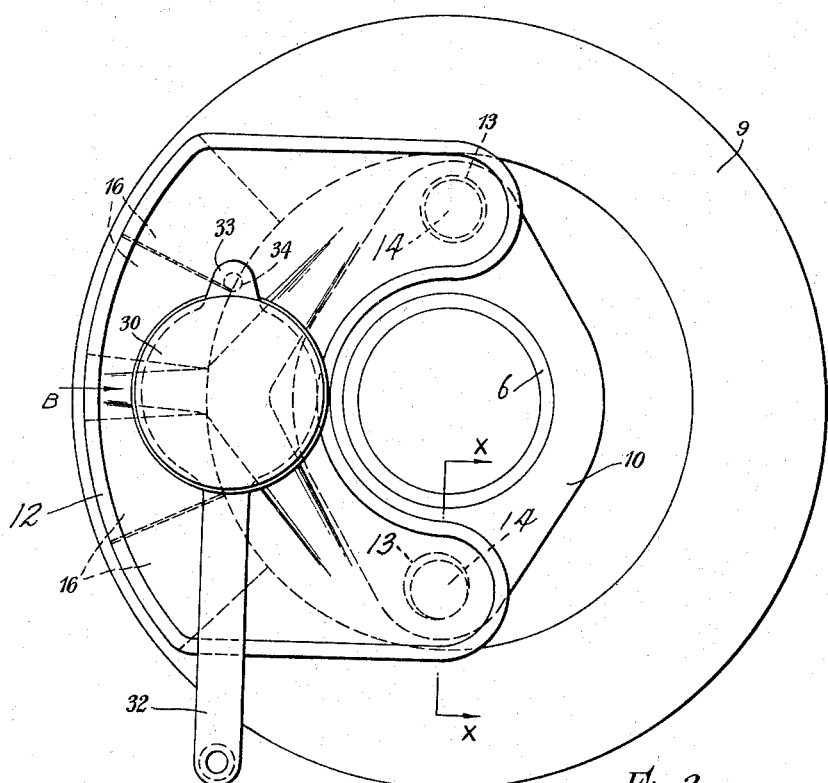
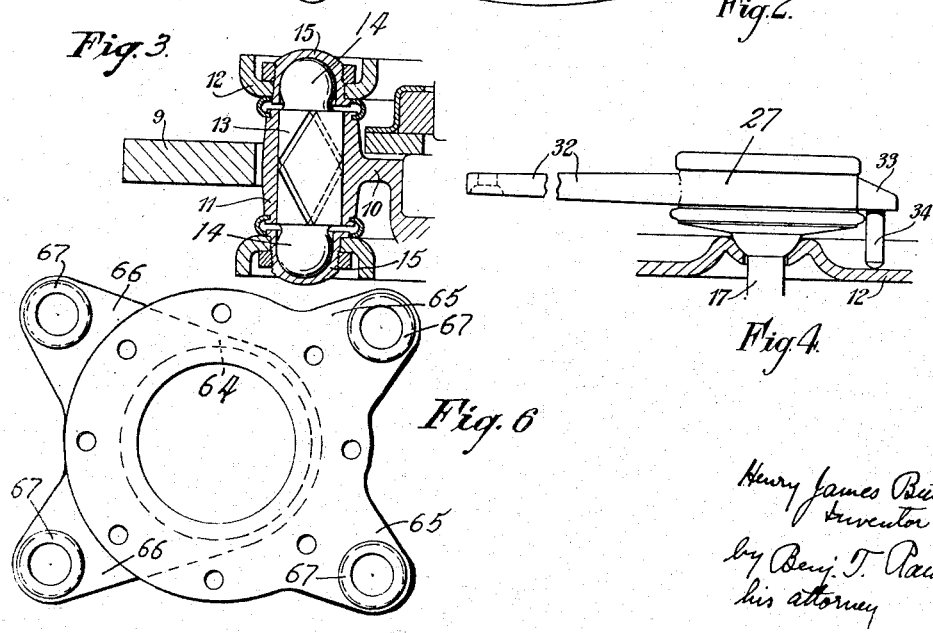

May 20, 1958 — H. J. BUTLER — 2,835,350
SPOT BRAKES
Filed Aug. 31, 1953 — 3 Sheets-Sheet 3

United States Patent Office 2,835,350
Patented May 20, 1958

2,835,350

SPOT BRAKES

Henry James Butler, Sutton Coldfield, England, assignor to Dunlop Rubber Company Limited, London, England, a British company Application August 31, 1953, Serial No. 377,579

Claims priority, application Great Britain September 4, 1952

8 Claims. (Cl. 188—73)

This invention relates to disc brakes and more particularly relates to wheel and disc brake assemblies for road vehicles, aircraft and the like.

Disc brakes for vehicles have been described in our co-pending U. S. application No. 319,379, filed November 7, 1952, and comprise an annular disc rotatable by a vehicle wheel, pivotable pressure plates located on each side of the disc, each having attached thereto a pad of friction material to frictionally engage the disc, and a fluid pressure operated mechanism to effect said engagement. These constructions are characterised in that the disc is secured at its inner periphery to the rotatable part of the wheel assembly. The pressure plates must then necessarily be pivotally attached to a non-rotatable member at a location outside the outer periphery of the disc and the fluid pressure operated mechanism must also be situated outside the outer periphery of the disc. The pressure plates are thus of considerable size and tend to deflect when the mechanism is pressurised, thus decreasing the efficiency of the brakes. These constructions, too, are apt to be somewhat heavy.

My present invention provides an improved disc brake, and an improved wheel and disc brake assembly for vehicles and aircraft, wherein these disadvantages are overcome.

According to my invention a disc brake assembly comprises an annular disc, means associated with the outer periphery thereof for rotating said disc, pressure plates located on each side of said disc and pivotally attached to a non-rotatable member at a location adjacent the inner periphery of the disc, pads of friction material secured to said plates to frictionally engage the radially-extending sides of said disc and a mechanism associated with one of said plates having an operating rod extending axially adjacent the inner periphery of said disc and secured to the other of said plates to effect said frictional engagement.

According to the present invention also a wheel and disc brake assembly comprises a wheel, an annular disc, means connecting the wheel with the outer periphery of the disc, a pressure plate located on each side of the disc and pivotally attached to a non-rotatable member forming part of the wheel assembly at a location adjacent the inner periphery of the disc, pads of friction material secured to said plates to frictionally engage the radially-extending sides of said disc and a fluid pressure operated mechanism associated with one of said plates having an operating rod extending axially adjacent the inner periphery of said disc and secured to the other of said plates to effect said frictional engagement. Preferably the operating mechanism is actuated by fluid pressure.

The disc brake may be a transmission brake for vehicles or machinery but its most important application is as a disc brake for a vehicle wheel. In one preferred construction the disc is secured at its outer periphery to the rim of the wheel or to a member secured to said wheel. A torque plate is secured to a non-rotatable part of the wheel assembly and two axially-aligned pressure plates, one on each side of the disc, are pivotally secured thereto. Preferably each pressure plate is provided with two legs which straddle the hub of the wheel, and the ends of the legs are pivotally secured to, or associated with the torque plate. A fluid pressure operated piston and cylinder mechanism is located adjacent one pressure plate, the piston having secured thereto an operating rod which passes axially adjacent the inner periphery of the disc and is secured to the other pressure plate so that operation of the piston and cylinder mechanism angularly forces the plates together, thus effecting frictional engagement between the disc and the friction pads secured to the pressure plates.

In another construction suitable for an aircraft wheel and brake assembly two discs may be provided, both axially slidable relative to the wheel. Intermediate pads of friction material are secured to an extension of the torque plate, and pressure plates, located on each side of the assembly of discs and pivotally secured to the torque plate, are adapted to be urged in a brake applying direction by a fluid pressure operated piston and cylinder mechanism and operating rod. Two pairs of pressure plates may be employed, diametrically opposed on each side of the discs.

In yet another construction an aircraft wheel and brake assembly comprises a pair of axially spaced discs secured at the outer periphery to an aircraft wheel, i. e. the discs are not axially slidable. Two pairs of pressure plates are provided, said pairs being diametrically opposed on opposite sides of the discs, one pair being associated with one disc and one with another.

In order that the invetnion may be more fully described, reference is made to the accompanying drawings, of which:

Figure 1 is a sectional view through a wheel and disc brake assembly for a motor vehicle, Figure 2 is a view of the brake assembly only, looking in the direction of arrow "A" of Figure 1, Figure 3 is a scrap section taken through the line X—X of Figure 2 and looking in the direction of the arrows, Figure 4 is a view of the hand-brake mechanism looking in the direction of arrow "B" of Figure 2, Figure 5 is a sectional view through an aircraft wheel and disc brake assembly constructed in accordance with another embodiment of the invention and, Figure 6 is a view of the torque plate shown in Figure 5.

In one embodiment of the present invention, illustrated in Figures 1 to 4 of the accompanying drawings, a motor-vehicle wheel and disc brake assembly comprises a wheel rim 1 secured by wire spokes 2 to a hub 3. The hub is bolted to a rotatable axle 4 and the axle is rotatable on bearings 5 within a fixed axle casing 6. An annular flange 7 extends radially outwardly from the hub, and the inner periphery of a drum-member 8 is secured thereto. The outer periphery of an annular disc 9 is secured to the outer periphery of said drum-member, the disc thus rotating with the drum-member, axle and wheel. The drum-member may be provided with holes or slots to promote turbulence.

Bolted to the end of the axle casing 6 is a torque member 10 comprising a substantially oval plate fitting diametrically within the inner periphery of the disc, said plate being integrally provided at each end with a hollow cylindrical boss 11 (Figure 3). Each boss extends equidistantly from both sides of the plate, and the axes of the bosses are parallel with the axis of the disc and wheel.

A pressure plate 12 is located on each side of the disc, said pressure plates being axially aligned and occupying only a minor portion, of the order of one quarter of each of the two braking faces of the disc. Each pressure plate has one edge curved to the outer periphery of the disc and the opposite edge straddles the axle 4. Both pressure plates are ribbed to give greater strength.

A pin 13 is fitted in each of the hollow cylindrical bosses 11 of the torque plate, each pin being provided at each end with a part-spherical head 14. The parts of the pressure plates straddling the axle are each provided with a cap 15 secured thereto, said caps being shaped complementary to, and receiving the heads of the pins. The head of one of the pins 13 and the caps 15 associated therewith, are slightly eccentric with respect to the axis of said pin. This arrangement is illustrated in Figs. 2 and 3, the center line of the heads 14 being offset to the left of the center line of the pin 13 as viewed in Fig. 3. This allows the pressure plates to accommodate themselves to and follow the deflections of the rotating disc, due, e. g. to bowing of the wheel axle and the like.

Twisting of the pressure plates relative to the axis of the wheel will cause the distance between the part-spherical heads taken along the longitudinal axis of the torque member 10 to decrease, but this movement rotates the rotatable pin 13 in the bush to accommodate for this decrease. Similarly, the pin may rotate in its bush if forces prevail to move the pressure plates angularly about the fixed pivot point constituted by the other pin 13.

Secured to the inner face of each pressure plate 12 is a set of four arcuate pads of friction material 16, each set being adapted to frictionally engage an adjacent braking face of the disc.

Each pressure plate is provided centrally with a hole, said holes being aligned adjacent the inner periphery of the disc. An operating rod 17 is fitted therethrough and rod being provided at one end with a head 18 having a part-spherical under surface to cooperate with a complementary seating in the associated pressure plate. A pin 18a is provided to prevent rotation of said head relative to the pressure plate. The other end of the rod is threaded and this end fits through a hole in a piston 19 said piston being provided with a part-spherical projection to co-operate with a complementary seating in its associated pressure plate. The operative portion of the piston 19 is annular and is fluid tightly slidable in an annular cylinder 20, sealing rings 21 being provided. The peripheries of the piston are inclined on both sides of the sealing rings to enable the cylinder to be moved angularly a small amount relative to the piston without the fluid-tight contact being broken.

The operating rod 17 is longitudinally slotted to give it a slight resilience, and a sleeve 22 is frictionally fitted to said rod at a location between the disc and the pressure plate associated with the piston and cylinder mechanism. A helically wound spring 23 is fitted over the rod and between the sleeve and said pressure plate, the rating of said spring being of a predetermined value. A volute spring 24 is fitted over the rod between the sleeve and the pressure plate on the other side of the disc, this spring being of a very light rating and its function being merely to exclude dirt and the like from the rod.

A rotatable member 25 is screwed to the threaded end of the operating rod, said member being provided with an outwardly-extending flange, and a Belleville washer 26 of known rating is fitted between said flange and the adjacent end of the annular cylinder. The outer periphery of said cylinder is provided with a skirt 27 extending axially away from the piston and a pre-tensioned clock-type spring 28 has one end secured to the rotatable member and the other end to a ring 29 fitted within and secured to said skirt. A rubber cap 30 covers the open end of the skirt and an annular rubber boot 31 is fitted between the piston and the cylinder, both cap and boot being provided to exclude dirt and the like.

A lever 32 (Figures 2 and 4) is formed integrally with the cylinder 20 and skirt 27 said lever extending adjacent the associated pressure plate and parallel with the major axis of the torque plate 10. The end of the lever remote from the cylinder is adapted to be connected to a hand-lever actuated linkage or cable and a projection 33 on the side of the cylinder diametrically opposed to said lever is provided with a pin 34 to abut the associated pressure plate.

The operation of the brake is as follows. The disc rotates with the wheel. A space between the piston 19 and the base of the cylinder 20 is connected to a source of fluid pressure, e. g. a master cylinder and operation of the master cylinder forces the piston and base of the cylinder mutually away from each other. The piston moves inwardly towards the disc and forces its associated pressure plate and friction pads into contact with one side of the disc. The cylinder simultaneously moves outwardly away from the disc and outward movement of the base of the cylinder first flattens the Belleville washer which is of less rating than the spring 23 and then, acting through the operating rod 17 connected to the other pressure plate, pulls the other pressure plate towards the disc, thus causing frictional engagement between the disc and the pads associated with said pressure plate. The spring 23 is compressed to allow the frictional engagement to take place. The total braking force is thus distributed equally on both sides of the disc and the disc, and hence the wheel is decelerated.

The major portion of the disc rotates clear of the friction pads, hence the disc is easily cooled; particularly when the drum 8 is provided with slots or holes to promote turbulence and since the pressure plates are comparatively small and robust there is little deflection, and hence the brake is very efficient in operation. The piston and cylinder mechanism is situated remote from the disc and thus the seals and the pressure fluid are not influenced by any heat generated in braking.

As the brakes are applied the spring 23, situated between sleeve 22 and the adjacent pressure plate, is compressed, and on removal of the braking pressure the spring, acting between the adjacent pressure plate and sleeve 22, which frictionally engages, with the resilient operating rod 17, allows the pressure plates to move away from the disc, hence allowing the friction pads to separate from the disc a predetermined distance.

If wear of the friction pads takes place, the braking pressure will first of all compress spring 23 and then, acting through the compressed spring, will move sleeve 22 along rod 17 to compensate for the wear, and when the braking pressure is removed spring 23 will again allow the predetermined clearance between the disc and pads. There will then be a clearance between the Belleville washer 26 and either the base of the cylinder 20 or the outwardly-extending flange of member 25. The pre-tensioned clock-type spring 28 will then rotate the member 25 until the Belleville washer is very lightly compressed, but not flattened, between said flange and said cylinder.

The brake is thus automatically adjustable for wear, and the clearance between pads and disc can be kept to very close limits, particularly since the pressure plates are so articulated that they follow the vibrations and out-of-truth of the disc when rotating.

The hand brake is applied by moving the lever 32, as by a cable assembly or the like, in a direction away from the disc. The lever and the cylinder fulcrum about the end of peg 34, which abuts the associated pressure plate, and hence said pressure plate is forced towards the disc and the cylinder is forced away from the disc. The cylinder has connected thereto the operating rod 17 and hence the pressure plate on the remote side of the disc is forced towards the disc. Owing to the small clearance maintained between the disc and pads a very small angular movement of the lever 32 is sufficient to achieve this, and the construction of the piston 19 is such as to enable this relative angular movement of piston and cylinder to take place without loss of pressure fluid.

In another embodiment of the invention, illustrated in Figures 5 and 6, an aircraft wheel and disc brake assembly comprises a wheel of conventional type, i. e. a rim 56, radially-extending vanes 57 and a hub 58 rotatable on bearings 59 on a fixed axle 60. An annular gap is provided on one side of the wheel to house the disc brake assembly.

Said disc brake assembly comprises a pair of axially spaced discs 61 and 62 secured at their outer peripheries to each end of a cylindrical member 63 which is secured to and rotatable by the wheel. A torque plate comprising a sleeve 64 is secured by flange 64a to the fixed axle of the wheel, said sleeve being provided at one end with two lugs 65 subtending between them an angle of the order of 90°, and at the other end with two similar lugs 66 diametrically opposed to said first two lugs 65 and also subtending between them an angle of the order of 90°. The sleeve is so positioned relative to the discs that one pair of lugs 65 are co-planar with disc 62 and the other pair of lugs 66 are co-planar with disc 61.

Each lug is formed integrally with a hollow cylindrical boss 67 through which a pin 68 is fitted. The ends of the pins are pivotally secured to pressure plates 69 and 70 in the manner described in the previous embodiments of the invention. In this case, however, the two pressure plates 69 are pivotally secured to lugs 65 and are positioned one on each side of disc 62, whilst pressure plates 70 are pivotally secured to lugs 67 and are positioned one on each side of disc 61 and are diametrically opposed to pressure plates 69. Since each pair of pressure plates only cover about one quarter of the braking surfaces of their associated disc a considerable area of each disc is exposed for cooling purposes.

Pads of friction material 71 are secured to the pressure plates to frictionally engage the adjacent braking faces of the disc and a piston and cylinder mechanism 72 and associated operating rod 73 are provided, as in the other embodiments of the invention, to effect frictional engagement between each set of pads and their associated disc.

The brake operates in substantially the same manner as is described hereinabove, with the exception that each set of pressure plates, friction pads, and operating mechanism is associated with only one disc. Comparatively large areas of each disc are thus exposed to cooling air and the brake is consequently not so liable to brake fade.

It is, of course, to be understood that any type of fluid pressure operated mechanism may be substituted for the piston and cylinder mechanism herein described, e. g. a sac, distensible bellows or the like. The brake may also be operated purely by mechanical means, e. g. a lever mechanism.

Having described my invention, what I claim is:

1. A wheel and disc brake assembly comprising a wheel, an annular disc, means connecting the wheel with the outer periphery of the disc, a non-rotatable member located adjacent the inner periphery of the disc, pressure plates located on each side of said disc and extending over a limited part of the path of rotation of the disc and having friction pads secured to said plates to frictionally engage the radially extending sides of said disc, a pair of pivotal supporting means for each of said pressure plates mounted on said non-rotatable member on opposite sides of the center of said disc and pivotally supporting said pressure plates to tilt in all directions, at least one of the supporting means of the pair being movable axially of said disc and transversely of the axis of the disc to enable the pressure plates to tilt inwardly toward said disc and to also enable said pressure plates to tilt to a limited extent in other directions to accommodate themselves to lateral vibrations and oscillations of said disc, and a fluid pressure mechanism associated with one of said plates having an operating rod extending axially adjacent the inner periphery of said disc and secured to the other of said plates to tilt said pressure plates toward said disc and effect said frictional engagement.

2. A wheel and disc brake assembly according to claim 1 wherein the pivital means to enable the pressure plates to tilt comprises a pair of spaced pins, one pin being on the opposite side of the axis of said disc from the other pin, each pin having part-spherical heads formed on its extremities, and wherein said pins are slidably and rotatably mounted parallel to the axis of said disc in said non-rotatable member and at least one of said pins having its part-spherical heads eccentric to the axis of said pin.

3. A wheel and disc brake assembly according to claim 2 wherein said non-rotatable member comprises a torque plate having a cylindrical boss at each end thereof said bosses extending equidistantly on either side of said torque plate, into one of which is fitted the fixed pin and into the other of which is fitted the rotatable pin.

4. The wheel and disc brake of claim 3 in which said operating rod is split longitudinally and in which the periphery of each piston in contact with a cylindrical wall is provided with a sealing ring and is slightly bevelled on each side of the ring to allow the piston to rock in its cylinder.

5. A disc brake assembly comprising an annular disc, means associated with the outer periphery thereof for rotating said disc, a non-rotatable member located adjacent the inner periphery of the disc, pressure plates located one on each side of said disc extending over a limited area of the path of rotation of said disc, friction pads secured to said plates to engage frictionally the radially extending sides of said disc, a pair of pivotal supporting means for each of said pressure plates mounted on said non-rotatable member on opposite sides of the center of said disc and pivotally supporting said pressure plates to tilt in all directions, at least one of the supporting means of the pair being movable axially of said disc and transversely of the axis of the disc to enable the pressure plates to tilt inwardly toward said disc and to a limited extend in other directions to accommodate themselves to lateral vibrations and oscillations of said disc, and a mechanism associated with one of said plates having an operating rod extending axially adjacent the inner periphery of said disc and secured to the other of said plates to effect said frictional engagement.

6. An assembly according to claim 5 wherein said disc is secured at its outer periphery to a drum secured to the vehicle wheel.

7. An assembly according to claim 5 wherein the operating mechanism is a fluid pressure actuated piston and cylinder device.

8. An assembly according to claim 7 having a longitudinally split operating rod connected to the piston of the fluid pressure operated piston and cylinder device and a device for automatically compensating for wear of the friction pads which comprises a friction collar carried by the rod, a helical spring encircling the rod and compressed between the collar and the base of the adjacent pressure plate, and a rotatable member in screw-threaded engagement with the end of the rod passing through the piston and cylinder device, said member being spring-urged to advance up the rod.

References Cited in the file of this patent

UNITED STATES PATENTS

| | | | |
|---|---|---|---|
| 2,084,216 | Poage et al. | June 15, 1937 |
| 2,115,083 | Pierce | Apr. 26, 1938 |
| 2,153,280 | Shelor | Apr. 4, 1939 |
| 2,533,093 | Clark | Dec. 5, 1950 |
| 2,541,032 | Butler | Feb. 13, 1951 |
| 2,586,518 | Collier | Feb. 19, 1952 |
| 2,655,228 | Eksergian | Oct. 13, 1953 |
| 2,655,229 | Eksergian | Oct. 13, 1953 |
| 2,655,230 | Buyze | Oct. 13, 1953 |
| 2,672,223 | Butler | Mar. 16, 1954 |
| 2,689,024 | Trevaskis | Sept. 14, 1954 |